US007516614B2

(12) United States Patent
Bitter

(10) Patent No.: US 7,516,614 B2
(45) Date of Patent: Apr. 14, 2009

(54) HYDRAULIC ARRANGEMENT

(75) Inventor: Marcus Bitter, Contwig (DE)

(73) Assignee: Deere & Company, Moline, IL (US)

( * ) Notice: Subject to any disclaimer, the term of this patent is extended or adjusted under 35 U.S.C. 154(b) by 499 days.

(21) Appl. No.: 11/412,213

(22) Filed: Apr. 26, 2006

(65) Prior Publication Data

US 2007/0012038 A1 Jan. 18, 2007

(30) Foreign Application Priority Data

Jul. 13, 2005 (DE) ....................... 10 2005 033 154

(51) Int. Cl.
*F16D 31/02* (2006.01)
*F15B 13/04* (2006.01)

(52) U.S. Cl. .............................. 60/469; 60/413; 91/450

(58) Field of Classification Search ................... 60/413, 60/414, 469; 91/420, 450
See application file for complete search history.

(56) References Cited

U.S. PATENT DOCUMENTS

| | | | | |
|---|---|---|---|---|
| 6,951,103 | B2 * | 10/2005 | Berthod et al. | 60/469 |
| 7,337,610 | B2 * | 3/2008 | Bitter | 60/469 |
| 2003/0115863 | A1 | 6/2003 | Holt et al. | |
| 2004/0006980 | A1 * | 1/2004 | Berthod et al. | 60/413 |
| 2006/0108185 | A1 * | 5/2006 | Bitter | 188/151 R |

FOREIGN PATENT DOCUMENTS

| | | |
|---|---|---|
| DE | 197 54 828 | 12/1997 |
| DE | 197 34 658 | 2/1999 |
| DE | 101 33 616 | 7/2001 |
| DE | 1 659 087 | 5/2006 |
| EP | 0 381 788 | 2/1989 |
| EP | 1 157 963 | 5/2001 |
| EP | 1 428 789 | 5/2001 |
| EP | 1 522 520 | 5/2001 |

OTHER PUBLICATIONS

European Search Report, Nov. 7, 2006, 7 Pages.

* cited by examiner

*Primary Examiner*—Michael Leslie

(57) ABSTRACT

An improved hydraulic arrangement is provided for a spring support system. The arrangement comprises a hydraulic cylinder, a hydraulic reservoir, a hydraulic fluid feeder, a hydraulic accumulator, a first control valve between the hydraulic cylinder and the accumulator, a second control valve between the hydraulic cylinder and the hydraulic reservoir as well as an automatic shut-off valve and a controller with a lifting position, a lowering position and a neutral position for the hydraulic cylinder. In order to prevent different pressure loads between the accumulator and the hydraulic cylinder, it is suggested to equalize the pressure between the accumulator and the hydraulic cylinder, without impairing the spring support system or the automatic shut-off valve. Accordingly, the accumulator is suitably connected to a non-return valve and to a flow restrictor or orifice.

10 Claims, 2 Drawing Sheets

HYDRAULIC ARRANGEMENT

FIELD OF THE INVENTION

The present invention relates generally to a hydraulic arrangement for a spring support system, comprising a hydraulic cylinder with first and second chambers, a hydraulic reservoir, a hydraulic fluid feeder conveying hydraulic fluid, a hydraulic accumulator, a first hydraulic line disposed between the hydraulic accumulator and the first chamber, a first control valve disposed in the first hydraulic line, a second hydraulic line disposed between the second chamber and the hydraulic reservoir, a second control valve disposed in the second hydraulic line, a first supply line for the first chamber, a second supply line for the second chamber, an automatic shut-off valve disposed in the first supply line, and a controller with at least three positions, comprising a lifting position, a lowering position and a neutral position for the hydraulic cylinder.

BACKGROUND OF THE INVENTION

In agricultural machines, such as telescopic loaders, wheel loaders or front loaders on tractors, it is known practice to use a hydraulic spring support system that provides spring support for the boom or the rocker in order to achieve overall improved spring suspension comfort on the vehicle, particularly during operation. To this end, the lifting side of the hydraulic cylinder is connected to a hydraulic accumulator by means of an appropriate hydraulic arrangement of valves in order to provide spring support through the hydraulic accumulator. Furthermore the lowering side of the hydraulic cylinder is connected to a hydraulic reservoir in order to prevent cavitation on the lowering side on one hand and to allow free movement of the piston rod during the spring support process on the other hand. To improve safety against a sudden lowering of the boom or the rocker, these spring support systems can be equipped with load holding valves or automatic shut-off valves to secure the hydraulic cylinder against ruptured hoses. However it is then necessary, in order to permit a lowering of the hydraulic cylinder, to close the reservoir connection on the lowering side of the cylinder so that sufficient pressure can be built up in order to open the load holding valve. Only after opening the load holding valve can oil flow from the lifting side of the hydraulic cylinder In EP 1157963 A2 a spring support system is proposed for the boom of a telescopic loader, which is provided with a load holding valve or an automatic shut-off valve in order to secure the boom against lowering. In order to affect a pressurized lowering of the boom on one hand, which requires the load holding valve to be opened, and provide a spring support function also in the neutral position of the hydraulic cylinder on the other hand, a separate control valve is provided. This control valve has to be closed in order to close a connection to the reservoir established for the spring support and to be able to build up the pressure in the supply line required to open the load holding valve. In the case of the spring support system disclosed in EP 1157963 A2, however, sudden lowering of the boom may occur as a result of different pressure loads in the hydraulic cylinder and the accumulator when a spring support position is engaged. Varying loads of this type can occur when the boom is loaded for example in the raised position and then the spring support position is engaged. This establishes a sudden connection, while different loads are present in the accumulator and the hydraulic cylinder. For safety reasons it is therefore necessary to lower the boom completely before activating the spring support function.

SUMMARY OF THE INVENTION

In view of the foregoing, it is an object of the invention to improve a spring support system of the kind mentioned above such that the spring support can be activated at any time, without resulting in a sudden lowering of the boom.

According to the invention, a hydraulic arrangement of the kind mentioned above is configured such that a third hydraulic line comprising a non-return valve that opens in the direction of the accumulator is disposed between the accumulator and the controller and that a fourth hydraulic line that reduces the flow is provided between the non-return valve and the first chamber, wherein the third hydraulic line between the automatic shut-off valve and the controller is connected to the first supply line and wherein the fourth hydraulic line between the non-return valve and the accumulator is connected to the third hydraulic line. This way, while the boom is being lifted and/or the hydraulic cylinder travels, it is guaranteed that the same pressure is applied on the accumulator by the flow-reducing means and by the non-return valve as that pressure with which the hydraulic cylinder travels. If the boom is loaded in the raised position, the pressure that builds up in the hydraulic cylinder as a result of the additional load is applied also on the accumulator via the flow-reducing means. The hydraulic cylinder lowers only little since no additional oil is being fed, however in this situation this does not present a safety risk. When the boom is unloaded, the pressure from the accumulator decreases via the first control valve and via the flow-reducing means into the first chamber of the hydraulic cylinder, and the boom lifts. When the boom is lowered, the pressure in the accumulator decreases via the first control valve and the flow-reducing means in the direction of the first chamber of the hydraulic cylinder, and the oil from the accumulator, together with the oil from the first chamber of the hydraulic cylinder, can drain off towards the hydraulic reservoir via the automatic shut-off valve, which has been opened for the lowering process.

The flow-reducing means is preferably configured as a hydraulic flow restrictor or orifice, which may be adjustable in its cross-section, where applicable, so that precise variations are possible for the hydraulic adjustment of the spring support system. Selecting the correct size of the flow restrictor or orifice ensures that due to the relatively small diameter of the flow restrictor or orifice no spring support action can occur, although the pressure between the hydraulic cylinder and the accumulator can be equalized when the boom spring support is turned off.

The first and second control valves preferably have a closed position and an open position, wherein the first and second control valves in the closed position close the flow in one or both directions, however open up the flow in both directions when they are in the open position, creating a spring support function in conjunction with the hydraulic accumulator and/or the hydraulic reservoir. The first and second control valves can be configured such that in the closed position they close the flow only in the direction of the hydraulic accumulator and/or the hydraulic reservoir. The first and second control valves can preferably be actuated electrically. Of course it is also conceivable to use other types of actuation for the first and second control valves, for example manual, pneumatic or hydraulic actuation.

The non-return valve and the flow-reducing means are preferably disposed directly at the hydraulic cylinder, allowing these components to be integrated in the existing arrangement according to EP 1157963 A1, in particular together with the automatic shut-off valve, so that both the spring support function and the automatic shut-off valve are not impaired as safety features on the boom.

When the spring support is supposed to be activated, which may be carried out by means of a switch actuated by the operator in the vehicle cab or for example also by means of a speed signal, the first and second control valves are moved into their open positions so as to connect the first chamber of the hydraulic cylinder to the accumulator and the second chamber of the hydraulic cylinder to the hydraulic reservoir. During excitation from the chassis of the work machine, a jerky acceleration can be cushioned by the freely swinging boom or rocker, thus achieving increased driving comfort. If the boom or the rocker is lowered while the spring support is activated, the connection of the second chamber of the hydraulic cylinder to the hydraulic reservoir is closed automatically as the second valve is switched to the closed position, and hydraulic fluid flows into the second chamber of the hydraulic cylinder, where now a sufficiently high pressure can be built up in order to open the automatic shut-off valve, which is crucial for lowering the boom or rocker. If the boom or rocker is raised in the lifting position of the controller while the spring support is activated, the second chamber of the hydraulic cylinder is connected automatically to the hydraulic reservoir so as to allow the hydraulic fluid, which has been displaced by the lifting process, to flow out of the hydraulic cylinder to the hydraulic reservoir. If any impact should be transmitted to the boom or the rocker during the lifting process, the boom or rocker can perform a spring deflection without the risk of cavitation since the second chamber is discharged towards the reservoir.

In the lowering position of the controller and with an activated spring support function, the second control valve has to be closed so as to interrupt the connection of the second chamber to the hydraulic reservoir. For this it is preferred if means are provided, which allow a determination whether the controller has assumed the lowering position or not. This can be implemented, for example, in the form of a switch or a sensor, which generates a signal in conjunction with or as a function of the positions of the controller, which signal then initiates the closure of the second control valve via a controller. In the case of electro-hydraulically actuated controllers, such a switch or sensor is typically not required because the software of an electronic controller can assume this task. Moreover it is also irrelevant how and where the position of the controller is detected; the only aspect of interest is the result as such. A switch of the kind mentioned above can be disposed on a joystick, on an actuating mechanism including linkage or also directly on the controller. It is also conceivable to use a sensor to record a proportional signal, which is then converted in a suitable electronic evaluation unit into an electrical signal for switching the control valve into the closed position. It would also be feasible to use a pressure switch or a pressure sensor, which determines the pilot pressure sent from a hydraulic joystick as an actuating signal to the controller. This shows that a plurality of possibilities is available for determining the position of the controller.

The controller is preferably configured as a slide valve with three positions and two input and outputs, respectively. In the individual positions, the supply lines to the hydraulic fluid feeder or the hydraulic reservoir are opened or closed in various ways corresponding to the actuating functions of the controller (lifting, lowering and neutral positions (stop).

The automatic shut-off valve preferably comprises a non-return valve that closes in the direction of the controller and a pressure control valve, wherein the pressure control valve can be actuated by the pressure levels present in the connecting lines. The actuation is carried out by pilot pressure lines, leading from the pressure control valve into the first and second supply lines. The non-return valve is disposed in a bypass line leading around the pressure control valve, wherein the non-return valve opens in the direction of the first chamber. Other possibilities for the shut-off valve are also conceivable. For example pressure switches can be used, which actuate a valve when the pressure drops.

The spring support system according to the invention ensures that always the same oil pressure exists in the accumulator and in the first chamber of the hydraulic cylinder so that the boom spring support can be turned on at any time, without running the risk that the boom may suddenly lower as the spring support is activated. In addition to improved safety features, the advantages of this spring support system are improved operating comfort compared to the spring support system revealed in EP 1157963 A1. The operating comfort is improved in that the vehicle operator no longer has to lower the boom completely before being able to activate the spring support system, but instead he can activate the boom spring support at any given time. This additionally results in time savings for the operator, since shorter work cycles can be achieved. As a result, operating costs can be saved.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
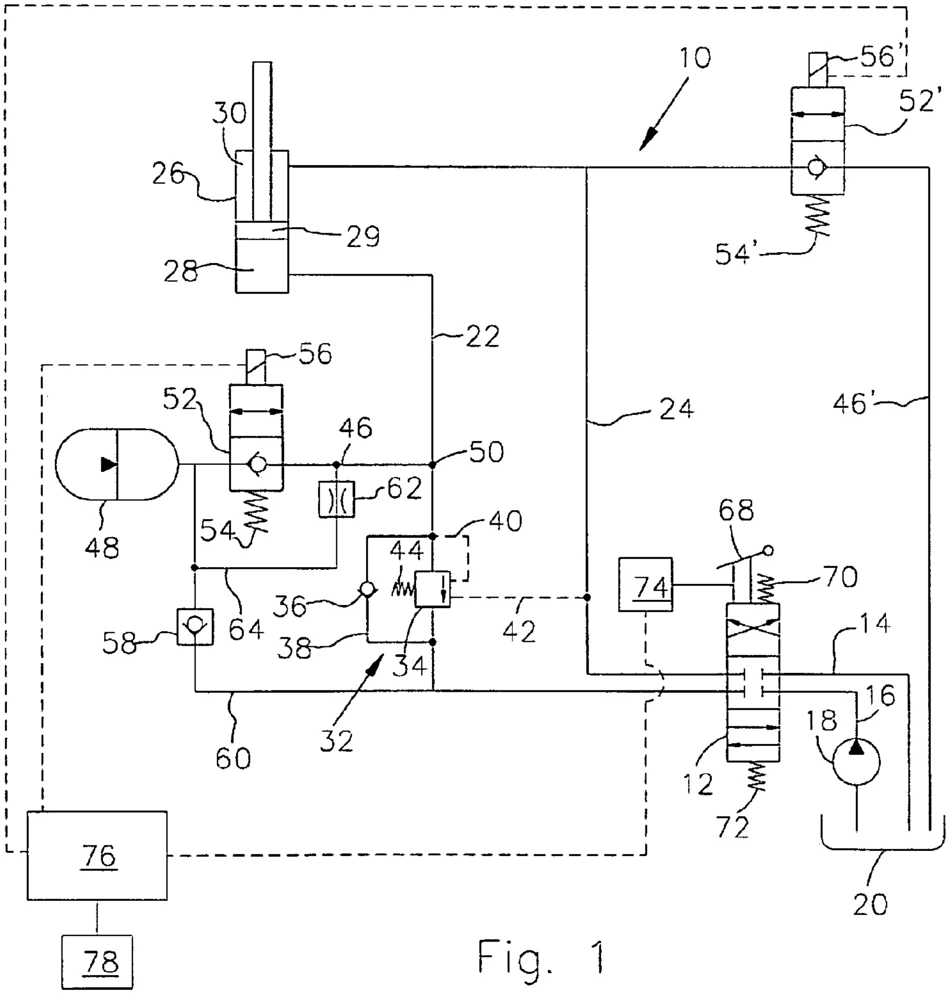
FIG. 1 is a hydraulic arrangement for a spring support system of a hydraulic cylinder; and, FIG. 2 is a schematic illustration of a telescopic loader comprising a hydraulic arrangement from FIG. 1.

A hydraulic arrangement 10 illustrated in FIG. 1 shows an example of an embodiment according to the invention for implementing a spring support system. The hydraulic arrangement 10 comprises a switchable controller 12, for example a slide valve, which is connected to a pump 18 and a hydraulic reservoir 20 via hydraulic lines 14, 16, wherein the controller 12 can be switched to three positions, i.e. a lifting position, a neutral position and a lowering position. The controller 12 is preferably switched manually, however it can also be switched electrically, hydraulically or pneumatically.

The controller 12 is connected to a hydraulic cylinder 26 via first and second supply lines 22, 24, wherein the first supply line 22 leads into a first chamber 28 of the hydraulic cylinder 26 and the second supply line 24 into a second chamber 30 of the hydraulic cylinder 26. A piston 29 separates the two chambers 26, 28 from each other. The first chamber 28 of the hydraulic cylinder 26 represents the chamber on the piston crown side or the lifting side, while the second chamber 30 represents the chamber of the hydraulic cylinder on the piston rod side or lowering side.

A load holding valve or automatic shut-off valve 32 is provided in the first supply line 22. The automatic shut-off valve 32 comprises a pressure- and spring-controlled pressure control valve 34 as well as a non-return valve 36 opening towards the hydraulic cylinder side, which valve is disposed parallel to the pressure control valve 34 via a bypass line 38. A pressurized connection is established between the pressure control valve 34 and the section of the first supply line 22 on the hydraulic cylinder side via a first pressure line 40. Another pressurized connection is established between the pressure control valve 34 and the second supply line 24 via a second pressure line 42. Moreover an adjustment spring 44 maintains the closed position of the pressure control valve 34.

A first hydraulic line 46 connects the first chamber 28 and/or the first supply line 22 to a hydraulic accumulator 48, with the end 50 of the first hydraulic line 46 not connected to the hydraulic accumulator 48 being disposed between the first chamber 28 and the automatic shut-off valve 32.

A first control valve 52 is disposed in the first hydraulic line 46. The first control valve 52 is an electrically switchable seat valve, which is held in the closed position by means of an adjustment spring 54 and is moved to the open position by means of a magnetic coil 56. In the closed position, the first control valve 52 seals off the flow in the direction of the accumulator 48. To this end, the first control valve 52 can also be configured such that it seals without leakage in both directions. In the open position, the flow of hydraulic fluid is guaranteed in both directions so as to establish a spring support function between the hydraulic cylinder 26 and the accumulator 48.

A second hydraulic line 46' connects the second chamber 30 and/or the second supply line 24 to the hydraulic reservoir 20.

A second control valve 52' is disposed in the second hydraulic line 46'. The second control valve 52' is an electrically switchable seat valve, which is held in the closed position by means of an adjustment spring 54' and can be brought into an open position by means of a magnetic coil 56'. In the closed position, the second control valve 52' seals the flow in the direction of the hydraulic reservoir 20. The second control valve 52' can also be configured such that it seals without leakage in both directions. In the open position, the flow of hydraulic fluid is guaranteed in both directions so as to establish a connection between the second chamber 30 of the hydraulic cylinder 26 and the hydraulic reservoir 20.

A non-return valve 58 is disposed in a third hydraulic line 60. The third hydraulic line 60 extends between the accumulator 48 and the controller 12, wherein the third hydraulic line 60 is connected to the first supply line 22 between the automatic shut-off valve 32 and the controller 12. The non-return valve 58 is configured such that it opens in the direction of the hydraulic accumulator 48.

A fourth hydraulic line 64, which is provided with an orifice or a flow restrictor 62, is disposed between the non-return valve 58 and the first chamber 28. At one end of the fourth hydraulic line 64 is connected to the third hydraulic line 60 between the non-return valve 58 and the hydraulic accumulator 48, and at the other end it is connected to the first hydraulic line 46 between the hydraulic cylinder 26 and the first control valve 52.

The individual operating states can now be actuated as follows by means of the controller 12 as well as the control valves 52, 52'. As is shown in FIG. 1, the controller 12 is held in the neutral position by adjustment springs 70, 72. The control valves 52, 52' have assumed a closed position. The controller 12 is switched from the neutral position into the lifting or lowering position by means of an actuating device 68, either through a control signal or manual actuation. The device can be a manual, electrical, hydraulic or pneumatic actuating device 68.

In the lifting position (in FIG. 1 the lowest position of the controller), the connection of the first supply line 22 to the pump 18 and the connection of the second supply line 24 to the hydraulic reservoir 20 are established. The pump 18, which is connected to the hydraulic reservoir 20, fills the first chamber 28 of the hydraulic cylinder 26 via the first supply line 22 and via the non-return valve 36 of the automatic shut-off valve 32 (the pressure control valve 34 of the load holding valve 32 is closed). As a result, the piston 29 travels in the direction of the second chamber 30 and pushes the oil present there through the second supply line 24 out into the hydraulic reservoir 20. At the same time, the same pressure is applied to the accumulator 48 via the third and fourth hydraulic lines 60, 64 and/or via the non-return valve 58 and the flow restrictor 62. Since the non-return valve 58 only opens in the direction of the accumulator, no oil can escape in the direction of the controller 12. If the neutral position is now activated again, the controller 12 interrupts the connections to the pump 18 and to the hydraulic reservoir 20, thus maintaining the pressure in the two chambers 28, 30 of the hydraulic cylinder 26 and suspending the movement of the piston 29. The piston 29 stops.

In the lowering position (in FIG. 1 the highest position of the controller), the connection of the first supply line 22 to the hydraulic reservoir 20 and the connection of the second supply line 24 to the pump 18 are established. The pump conveys oil into the second chamber 30 of the hydraulic cylinder 26, wherein the pressure, which builds up in the second supply line 24, opens the pressure control valve 34 via the second pressure line 42 of the automatic shut-off valve 32. At the same time the piston 29 is moved in the direction of the first chamber 28, thus allowing the oil flowing out of the first chamber 28 to drain into the hydraulic reservoir 20 via the first supply line 22 and the open pressure control valve 34.

The automatic shut-off valve 32 thus ensures that the hydraulic cylinder 26, in the neutral position, maintains its position and/or that in the lifting and neutral positions no oil can escape from the pressurized first chamber 28, and that in the lowering position the oil can drain from the first chamber 28 via the open pressure control valve 34. In order to guarantee this, the automatic shut-off valve 32 should or must be disposed—as is illustrated—on the lifting side of the hydraulic cylinder 26, with the lifting side being that side of the hydraulic cylinder 26 in which pressure is being built up for lifting a load. In the example illustrated here, the lifting side is the first chamber 28 of the hydraulic cylinder 26, with the second chamber 30 also being able to serve as the lifting side if the hydraulic cylinder 26 were reversed. The first pressure line 40 represents a load-limiting device so that in the case of excessively high operating pressures in the first chamber 28 of the hydraulic cylinder 26, which can develop for example as a result of excessively high loads, a limit pressure is reached in the first pressure line 40, which opens the pressure control valve 34 to release pressure.

A switch or sensor 74 that is connected to the actuating device 68 detects the positions of the controller 12, and a signal is transmitted to a controller 76. The controller 76 is connected to the first and second control valves 52, 52'. The spring support is activated by means of an activating switch 78, which emits an activating signal to the controller 76.

As soon as an activating signal has been issued, the control unit 76 activates the spring support by opening the first and second control valves 52, 52'. As long as the control valves 52, 52' are in the closed position, the hydraulic cylinder 26 is separated from the accumulator 48 on one side and from the hydraulic reservoir 20 on the other side and cannot perform any spring-supported movements. Only upon activation of the spring support system, i.e. upon opening the two control valves 52, 52' and/or by connecting the accumulator 48 and the hydraulic reservoir 20, can the piston 29 travel in a spring-supported manner, i.e. move in both directions.

As a function of the different positions of the controller 12, the following operating states are possible for a spring support function that is activated by the activating switch 78.

In the lowering position (highest position of the controller from FIG. 1), the first supply line 22 is connected to the hydraulic reservoir 20 and the second supply line 24 is connected to the pump. At the same time, the second control valve 52' has to be closed so that the appropriate pressure can build up on the second supply line 24 and/or in the second chamber 30, by means of which pressure the pressure control valve 34 is opened via the pressurized line 42 so that oil can flow out of the first chamber 28 into the hydraulic reservoir 20 via the first supply line 22. The second control valve 52' is closed, preferably electronically, as soon as the sensor 74 has detected the lowering position on the controller 12. When the controller 12 is moved out of the lowering position again into the neutral or lifting position, the second control valve 52' opens up and the piston 29 can perform a spring-supported movement.

In the neutral position (second position from the top of the controller 12 from FIG. 1), all inputs and outputs on the controller 12 are closed, i.e. no oil can flow through the supply lines 22, 24 to the controller 12. During a spring-supported movement, the piston 29 can travel freely in both directions since oil can drain from the first chamber 28 via the open first control valve 52 into the accumulator 48 and from the second chamber 30 via the open second control valve 52' into the hydraulic reservoir.

In the lifting position (third position from the top of the controller 12 from FIG. 1), the first supply line 22 is connected to the pump 18 and the second supply line 24 is connected to the hydraulic reservoir 20. Appropriate pressure builds up in the first supply line 22 and/or in the first chamber 28, as a result of which the piston 29 is lifted, thus allowing oil to drain from the second chamber 30 via the second supply line 24 into the hydraulic reservoir 20. At the same time the piston 29 is able to perform spring-supported movements since a connection is established to the accumulator 48 on the lifting side and a connection is established to the hydraulic reservoir 20 on the lowering side.

When the spring support function is activated, the piston 29 can perform a free spring deflection. If it travels downward as a result of impact transmitted to it, the oil is pushed out of the first chamber 28 into the accumulator 48. The pressure building in the accumulator 48 allows the oil to flow back into the first chamber 28, so that the piston 29 travels upward again. This spring-supported movement is repeated, where applicable, until the impact has been completely absorbed.

Figure 2:
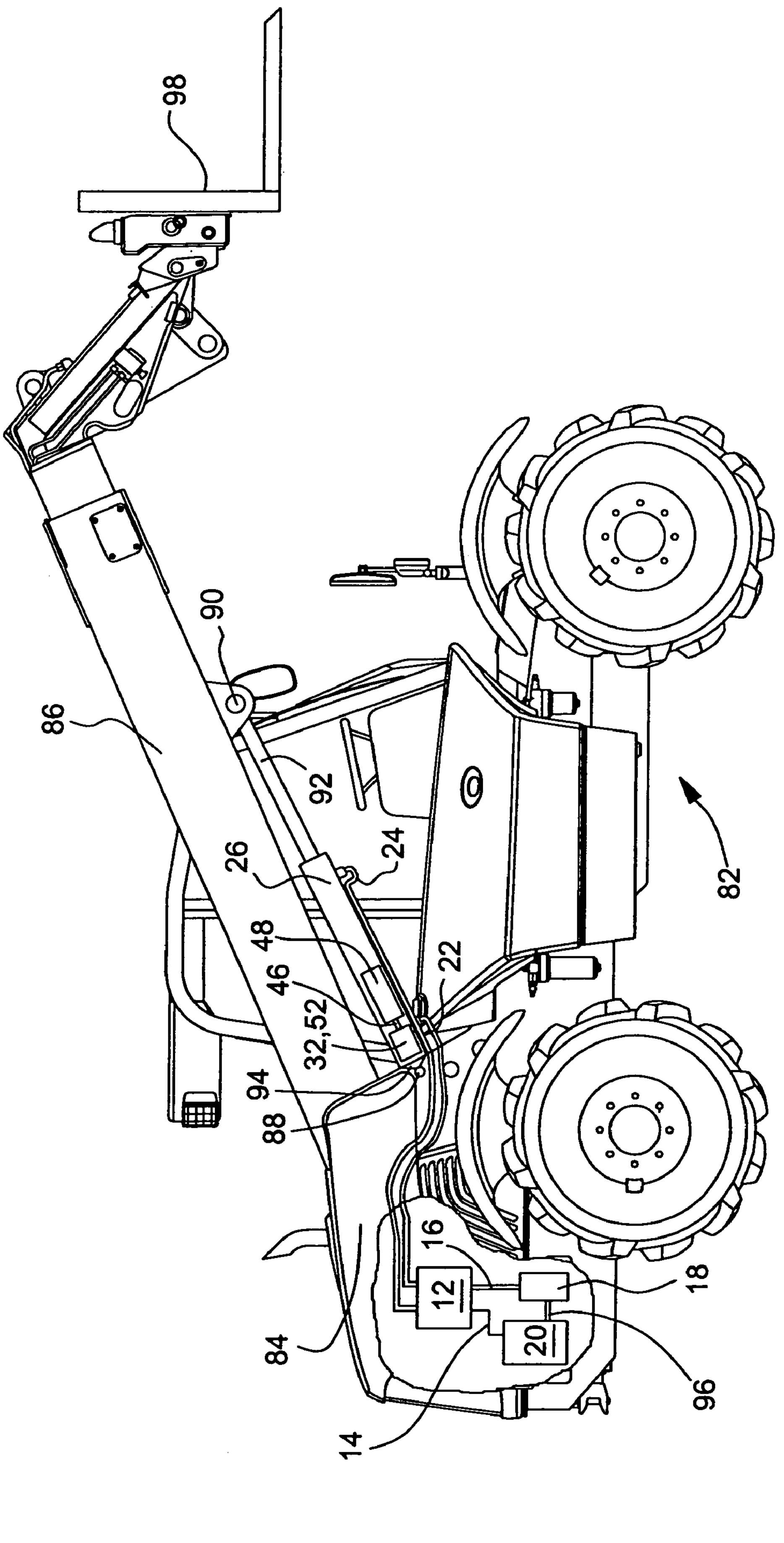

An application of the embodiment illustrated in FIG. 1 is illustrated in FIG. 2. FIG. 2 shows a mobile telescopic loader 82 with a boom 86, which can be telescoped and is pivotably mounted on a housing 84 or frame of the telescopic loader 82. A hydraulic cylinder 26 for lifting and lowering the boom 86 is disposed between the boom 86 and the housing 84. The hydraulic cylinder 26 is pivotably connected to first and second bearing areas 88, 90, wherein the piston rod side 92 is mounted to the second bearing area 90 on the boom 86 and the piston crown side 94 is mounted to the first bearing area 88 on the housing 84. Furthermore, the hydraulic reservoir 20, the pump 18 and the controller 12 are positioned on or in the housing 84 and mutually connected by means of hydraulic lines 14, 16, 96. In addition the supply lines 22, 24 between the controller 12 and the hydraulic cylinder 26 are shown in FIG. 2. The automatic shut-off valve 32 as well as the control valve 52 are disposed in a common valve module directly on the hydraulic cylinder 26. The accumulator 48 is preferably disposed directly on the hydraulic cylinder 26 as well, so that the first hydraulic line 46 can be configured as a rigid connection between the common valve module and the accumulator 48, requiring no separate automatic shut-off valve. According to the above-described positions, the hydraulic cylinder 26 can be actuated such that the boom 86 is lifted, held in place or lowered or that it can perform spring deflections. If the spring support has been activated, it is ensured that during excitation, for example from the chassis of the telescopic loader 82, jerky accelerations as a result of a freely swinging boom 86 can be absorbed, thus increasing the driving comfort, particularly when loads are being picked up and moved using an implement 98.

The inventive arrangement of the non-return valve 58 and the flow restrictor 62 guarantees that the pressure between the accumulator and the first chamber is always equalized and eliminates the risk of a plunging or sinking of the boom 86 in the different load states. The boom 86 can be loaded for example in the raised position, without having to fear sudden lowering as the spring support function is activated, because prior to that the pressure between the accumulator and hydraulic cylinder was able to be equalized.

While the invention is described on the basis of only one exemplary embodiment, the person skilled in the art—in the light of the above description and the figures—will be able tap various alternatives, modifications and variations, which are covered by the present invention. The hydraulic arrangement for example can also be applied on other vehicles, for example on wheel loaders or front loaders, or also on excavators or cranes, which comprise hydraulically actuated components that can be lifted or lowered and where spring support seems useful.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. An improved hydraulic arrangement for a spring support system, the hydraulic arrangement having a hydraulic cylinder with first and second chambers, a hydraulic reservoir, a hydraulic fluid feeder conveying hydraulic fluid, a hydraulic accumulator, a first hydraulic line disposed between the hydraulic accumulator and the first chamber, a first control valve disposed in the first hydraulic line, a second hydraulic line disposed between the second chamber and the hydraulic reservoir, a second control valve disposed in the second hydraulic line, a first supply line for the first chamber, a second supply line for the second chamber, an automatic shut-off valve disposed in the first supply line, and a controller with at least three positions, comprising a lifting position, a lowering position and a neutral position for the hydraulic cylinder, wherein the improvement comprises:

a third hydraulic line provided with a non-return valve that opens in the direction of the accumulator and is disposed between the accumulator and the controller; and, a fourth hydraulic line provided with a flow-reducing means disposed between the non-return valve and the first chamber, with the third hydraulic line being connected to the first supply line between the automatic shut-off valve and the controller and the fourth hydraulic line being connected to the third hydraulic line between the non-return valve and the accumulator.

2. The improved hydraulic arrangement according to claim 1, wherein the flow-reducing means is configured as one of an orifice or a flow restrictor.

3. The improved hydraulic arrangement according to claim 1 wherein the first control valve has a closed position and an open position.

4. The improved hydraulic arrangement according to claim 3, wherein in the closed position the first control valve closes in the direction of the accumulator.

5. The improved hydraulic arrangement according to claim 1, wherein the second control valve has a closed position and an open position.

6. The improved hydraulic arrangement according to claim 5, wherein in the closed position the second control valve closes in the direction of the hydraulic reservoir.

7. The improved hydraulic arrangement according to claim 1, wherein the non-return valve and the flow-reducing means are disposed on the hydraulic cylinder.

8. The improved hydraulic arrangement according to claim 1, wherein said second control valve is an electrically responsive valve which is shiftable from a normally closed position to an open position in response to receiving an electrical input signal; and an electrical control arrangement coupled to said second control valve and including a position sensor associated with said controller with at least three positions for sensing the positions of said controller and generating a corresponding position signal and sending an input signal to said second control valve only when said controller is in said neutral position, whereby said second control valve is de-energized and moves into said closed position when the controller assumes the lowering position.

9. The improved hydraulic arrangement according to claim 1, wherein the controller is a slide valve, which has at least two inputs and two outputs for each position.

10. The improved hydraulic arrangement according to claim 1, wherein the automatic shut-off valve comprises a non-return valve that closes in the direction of the controller and a pressure control valve, the pressure control valve being actuatable by a pressure present in the first and second supply lines.

* * * * *